(12) United States Patent
DuRocher

(10) Patent No.: US 7,317,392 B2
(45) Date of Patent: Jan. 8, 2008

(54) APPARATUS FOR OCCUPANT DETECTION

(75) Inventor: Daniel J. DuRocher, Metamora, MI (US)

(73) Assignee: Methode Electronics, Inc., Chicago, IL (US)

( * ) Notice: Subject to any disclaimer, the term of this patent is extended or adjusted under 35 U.S.C. 154(b) by 235 days.

(21) Appl. No.: 11/236,728

(22) Filed: Sep. 28, 2005

(65) Prior Publication Data

US 2006/0066085 A1    Mar. 30, 2006

Related U.S. Application Data

(60) Provisional application No. 60/613,724, filed on Sep. 29, 2004.

(51) Int. Cl.
*G08B 13/26* (2006.01)
(52) U.S. Cl. ............... 340/562; 340/438; 340/666; 340/667; 340/545.4; 340/561; 280/734; 280/735
(58) Field of Classification Search .............. 340/562, 340/438, 666, 667, 545.4, 561; 280/734, 280/735
See application file for complete search history.

(56) References Cited

U.S. PATENT DOCUMENTS

| 5,691,693 | A | 11/1997 | Kithil |
| 5,844,486 | A | 12/1998 | Kithil et al. |
| 6,158,768 | A | 12/2000 | Steffens, Jr. et al. |
| 6,345,839 | B1 | 2/2002 | Kuboki et al. |
| 6,360,600 | B1 | 3/2002 | Kuroki et al. |
| 6,559,555 | B1 | 5/2003 | Saitou et al. |
| 6,577,023 | B1 | 6/2003 | Stanley et al. |
| 6,927,678 | B2 | 8/2005 | Fultz et al. |
| 7,135,983 | B2 * | 11/2006 | Filippov et al. ............ 340/667 |
| 2001/0045733 | A1 * | 11/2001 | Stanley et al. .............. 280/735 |

OTHER PUBLICATIONS

Patent Cooperation Treaty, International Search Report and Written Opinion, dated Jan. 16, 2007.

* cited by examiner

*Primary Examiner*—Tai Nguyen
(74) *Attorney, Agent, or Firm*—Blank Rome LLP

(57) ABSTRACT

An apparatus for occupant detection in a vehicle, including a dielectric substrate with a reference plane, and a plurality of electrodes forming a capacitive array on said dielectric substrate and coupled to said reference plane. Each of the plurality of electrodes being formed of a conductive polymer thick film ink. The plurality of electrodes and the reference plane are connected to a controller that detects a change in capacitance between the plurality of electrodes and the reference plane, and identifies the presence and type of occupant in the vehicle.

15 Claims, 2 Drawing Sheets

APPARATUS FOR OCCUPANT DETECTION

RELATED APPLICATION

This application claims priority to U.S. Provisional Application Ser. No. 60/613,724, filed on Sep. 29, 2004, the subject matter of which is hereby incorporated by reference.

FIELD OF THE INVENTION

The present invention is an apparatus for occupant detection for proper deployment of an airbag. More specifically, the apparatus of the present invention employs capacitive arrays formed of printed conductive polymer thick film inks.

BACKGROUND OF THE INVENTION

Automotive vehicles increasingly incorporate inflatable restraint devices for protecting occupants during crash and rollover events. These airbag devices may be located in the instrument panel or steering wheel for frontal impacts, or in the interior sides or roof of the vehicle for side impacts or vehicle rollover.

Although offering the potential to save lives or reduce the seriousness of injury, these devices can also present a danger of their own. In order to provide effective protection, particularly during crash events, it is necessary to deploy the inflatable devices within a very short time span; typically within 5 to 20 milliseconds. Given the energy involved in a crash event, the deployment of the inflatable devices must also be extremely forceful. If an occupant is not in a proper position, there is potential for bodily harm or death resulting from the deployment of the inflatable device. Other circumstances that can lead to serious injury or death are the presence of a small child, and particularly in the case of a frontal airbag, a child situated in a rear facing child seat.

In order to mitigate the likelihood of injury or death directly resulting from inappropriate airbag deployment, it is necessary for the system controller, prior to airbag deployment, to first determine the presence of an out-of-position occupant, a child occupant, or a child occupant situated in a child seat and, in the latter case, whether the child seat is facing forward or rearward. Based on these factors (and other information), the decision can be made by the controller for either no deployment, full deployment, or, in the case of multiple stage airbags, deployment with reduced energy.

There is a further need for occupant presence and position detection relating to cost savings to the consumer. Once an airbag has deployed, it is not reusable. By inhibiting airbag deployment in the instance where no occupant is present within the envelope of protection offered by the airbag, the considerable cost of removing and replacing the airbag while repairing the vehicle is avoided.

A number of methods of detecting occupant presence and position are either in use or have been proposed. These include the use of ultrasonic, radio frequency or optical sensing means that generate an electronic "image" of any objects within the envelope of protection offered by the airbag. These methods are not without shortcomings. In addition to the considerable computing power required to ascertain the shape and location of the object, the possibility exists that the object can be misinterpreted. For example, an occupant seated in the proper position but reading a newspaper might be interpreted as an inanimate object.

Another approach is to determine the weight of an object located in a seat. This can be accomplished either by measuring the overall weight of the seat with sensors at its attachment point and then calculating the weight of the object or occupant in the seat, or by directly measuring the object or occupant weight by means of a sensor or sensors located within the seat structure. An example of the latter is taught in U.S. Pat. No. 5,975,568 to Speckhart et al. (incorporated herein by reference) that discloses a weight-sensing pad incorporated into an automobile seat. The pad is comprised of a bladder containing a non-compressible fluid in conjunction with a pressure sensor disposed under the foam seat cushion. Weight on the pad increases the sensed pressure value, which can then be used to infer the weight of the occupant.

Sensing the weight alone of an object contained within the seat, although useful information, is nonetheless an incomplete depiction of the information desired for making an airbag deployment decision. The weight parameter alone does not, for example, provide discrimination between animate and inanimate objects. In the case where the object is a human, weight measurement provides minimal, if any, indication of whether the occupant is in the proper position for an airbag deployment.

Other methods are described in the art which employ proximity sensors to detect the presence and location of a vehicle occupant. For example, U.S. Pat. No. 6,158,768 to Steffens et al. discloses an array of capacitive electrodes disposed in and around the automobile seat. The presence and relative position of a vehicle occupant within the electrostatic fields set up by the electrodes is then sensed. The occupant's weight is not measured directly, but rather inferred from a measure of the occupant's girth as measured by the capacitive array.

Yet another approach for detecting occupant presence and position is disclosed in U.S. Pat. No. 6,927,678 to Fultz et al. (incorporated herein by reference) which involves the use of a capacitive array similar to that taught by Steffens et al. in conjunction with a fluid filled bladder, as taught by Speckhart et al. In the Fultz et al. arrangement, the bladder does not employ a sensor means for directly measuring the increase in fluid pressure caused by the presence of an occupant or object in the seat. Rather, a capacitive array is disposed in the seat bottom, with the electrodes capacitively coupled to a reference plane. The fluid filled bladder is disposed between the capacitive electrodes and the reference plane such that, as the weight of the occupant compresses the bladder, the electrodes are urged into closer proximity with the capacitively coupled reference plane. Depending on the amount of change of capacitance and the relative difference of capacitance between the electrodes, various information about the occupant size, location, and weight can be calculated.

Another use for capacitive arrays has been disclosed in U.S. Pat. No. 5,691,693 to Kithil (incorporated herein by reference). In that invention, an array of capacitive sensors is located proximate to the head of a vehicle operator. The signals from the array are fed into a microprocessor which triangulates the head position and tracks head movement in order to discern patterns of movement indicative of operator impairment due to fatigue, alcohol/drug use, etc.

The capacitive electrodes of these and similar systems are typically constructed of copper or aluminum metalization on a flexible substrate. The electrical connection to the metalized areas is typically done by soldering; therefore, the substrate material must be able to withstand high temperatures associated with soldering. Substrate materials, such as polyamide, that are capable of withstanding soldering temperatures are more costly that otherwise suitable substrate materials, such as polyester.

Another significant cost associated with manufacturing traditional capacitive arrays is the materials and processes used to deposit the electrical traces onto the flexible substrate. The typically used photoetching process requires a number of complex process steps before the complete circuit is fabricated. Use of this process also requires compliance to environmental plating regulations, which further adds to its cost. Moreover, it is not unusual for pricing fluctuations of 50% or more for the metals typically used as the conductive material. A lower cost and simpler materials and manufacturing solution would therefore be advantageous.

It is often desirable to dispose arrays in multiple layers on the same substrate. However, the conventional processes of depositing metal conductors on a substrate do not easily lend themselves to this need.

SUMMARY OF THE INVENTION

Accordingly, an object of the present invention is to provide an apparatus for detecting and identifying an occupant in a vehicle that is less costly than conventional devices.

Another object of the present invention is to provide an apparatus for detecting and identifying an occupant in a vehicle that includes a simplified manufacturing process.

The foregoing objects are basically attained by an apparatus for occupant detection in a vehicle, including a dielectric substrate with a reference plane, and a plurality of electrodes forming a capacitive array on the dielectric substrate and coupled to the reference plane. Each of the plurality of electrodes being formed of a conductive polymer thick film ink. The plurality of electrodes and the reference plane are connected to a controller that detects a change in capacitance between the plurality of electrodes and the reference plane, and identifies the presence and type of occupant in the vehicle.

The foregoing objects are also basically attained by an apparatus for occupant detection in a vehicle including a dielectric substrate including first and second sections, a reference plane disposed on the first section of the dielectric substrate, and a plurality of electrodes forming a capacitive array on the second section of the dielectric substrate and coupled to the reference plane. Each of the plurality of electrodes are formed of a conductive polymer thick film ink. A deformable bladder is disposed between the first and second sections of the dielectric substrate. A controller is connected to the plurality of electrodes and the reference plane. The controller detects a change in capacitance between the plurality of electrodes and the reference plane upon compression of the bladder, thereby identifying the presence and type of occupant in the vehicle.

Other objects, advantages and salient features of the invention will become apparent from the following detailed description, which, taken in conjunction with the annexed drawings, discloses a preferred embodiment of the present invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
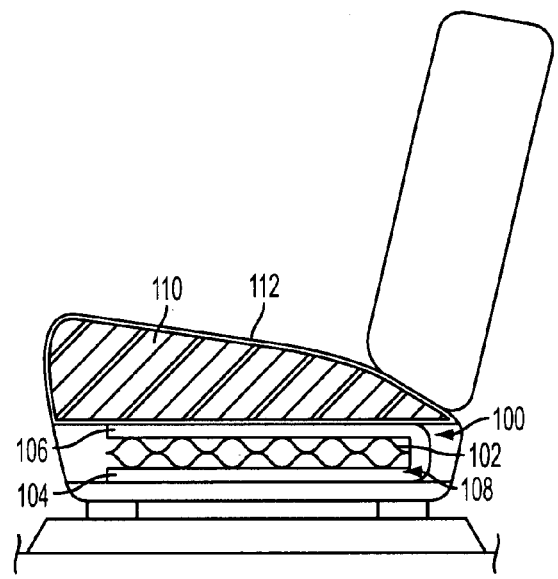
FIG. 1 is a side elevational view of the apparatus in accordance with the present invention, showing the apparatus used with a vehicle seat.

Referring to FIGS. 1-4, an apparatus 100 for detecting and identifying an occupant in a vehicle for proper deployment of a vehicle airbag in accordance with the present invention generally includes, a deformable fluid filled bladder 102 disposed between first and second sections 104 and 106 of a dielectric substrate 108 disposed under a cushion 110 of a vehicle seat 112. The apparatus 100 significantly reduces costs by using a capacitive array 200 on the substrate 108 that is formed of conductive polymer thick film ink.

Figure 2:
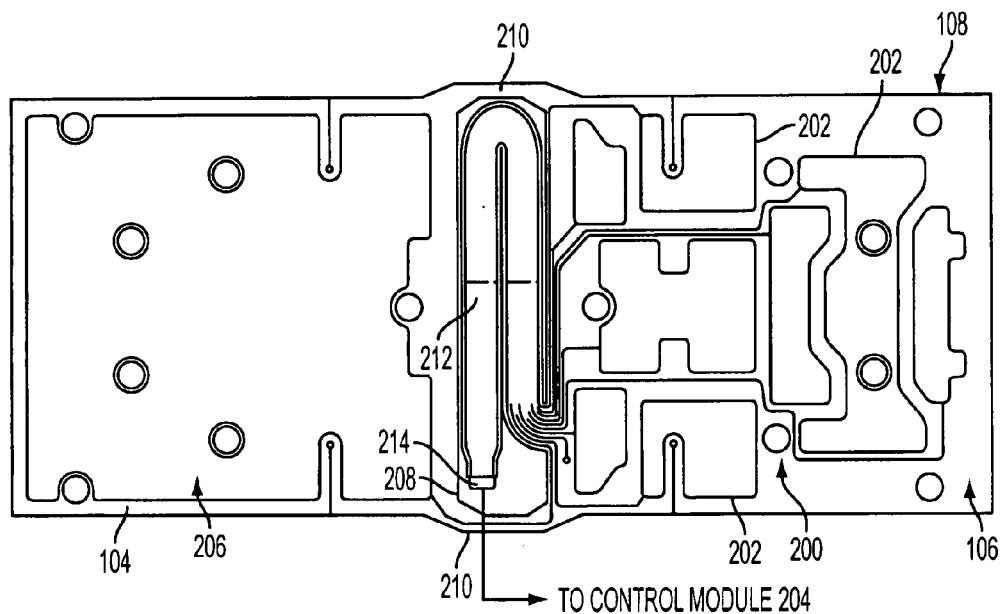
FIG. 2 is a top plan view of a substrate of the apparatus illustrated in FIG. 1, showing a capacitive array and reference plane disposed on the substrate.
Figure 3:
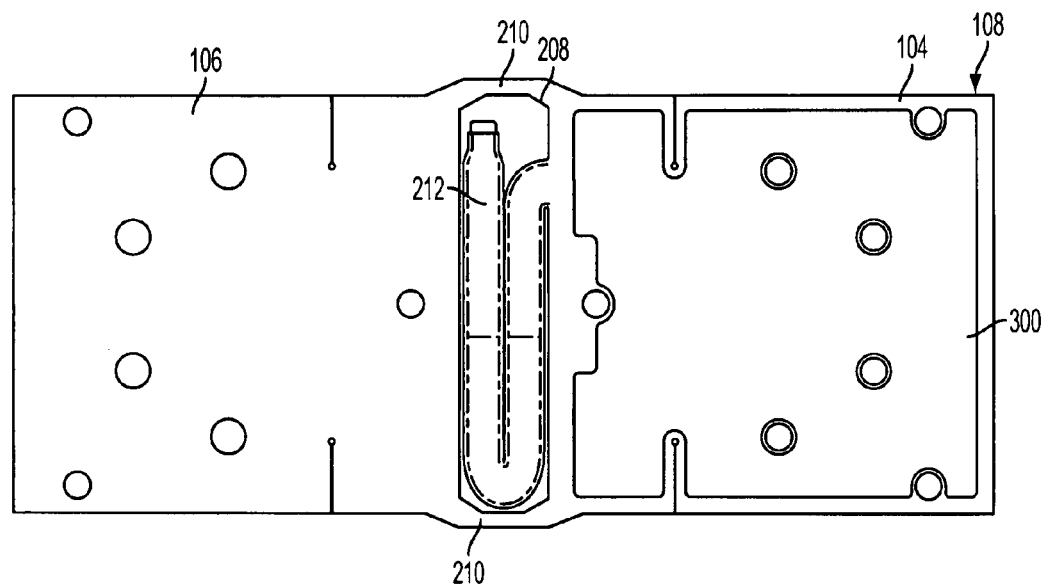
FIG. 3 is a bottom plan view of the substrate illustrated in FIG. 2, showing a shield plane disposed on the substrate.

As seen in FIG. 2, the capacitive array 200 includes a plurality of electrodes 202 disposed on the second section 106 of the substrate 108 and electrically coupled to a controller or control module 204. The electrodes 202 are capacitively coupled to a reference plane 206 on the first section 104 of the substrate 108. An opening 208 is disposed between the first and second sections 104 and 106 of the substrate 108 forming connecting arms 210. Substrate 108 can be made as a unitary one-piece member or as separate pieces integrally attached. Opposite the electrodes 202 on the substrate 108 is a shield plane 300, as seen in FIG. 3. Substrate 108 can be entirely flexible, or partially flexible and partially rigid. For example, the first and second sections 104 and 106 can be rigid and connecting arms 210 can be flexible to form a flexible hinge.

As seen in FIGS. 2 and 3, the electrodes 202 and reference plane 206 are connected through conductors 212 to an ultrasonically bonded connector 214. Conductors 212 connect to the electrodes 202 in array 200 and the reference plane at one end and connector 214 at the other end. Connector 214 can connect either directly to the control module 204 or indirectly through a vehicle wire harness (not shown) to the control module 204.

The apparatus 100 reduces the manufacturing cost of the capacitive array 200 by substituting copper used in conventional devices with printed conductive polymer thick film (PTF) ink. PTF inks are typically a matrix of thermoplastic or thermoset resins with solvents and conductive and/or resistive materials. The conductive or resistive particles available include, but are not limited to, silver, carbon, nickel, copper, tin, and gold. The inks can be printed, silk-screened, stenciled, sprayed, etc. onto the dielectric substrate 108. The inks are cured either at room temperature or by the application of heat. The curing process serves to evacuate the solvents from the matrix and, in the case of thermoset resins, to cure, or permanently harden, the resin. Because the capacitive array 200 with reference plane 206 can operate as a high impedance field sensor, the high monetary expense of solid metal conductors and their associated application processes used in conventional devices is avoided. The conductors 212 can also be formed by the application of PTF ink.

As noted above, the conventional method of interconnecting to the prior art electrodes has been soldering, which results in a relatively large heat affected zone, and, in turn, necessitates the use of substrate materials having a relatively high resistance to thermal degradation. In the present invention, interconnection to the PTF conductors 212 is accomplished by an ultrasonic welding process, as disclosed in U.S. Pat. No. 6,217,373 to Johnston (incorporated herein by reference). Johnston teaches the use of directing ultrasonic energy, in conjunction with high clamping pressure, to bond a connector assembly and associated interconnect wires, to a flexible substrate and PTF conductors, respectively. The nature of this interconnection process is such that minimal heat is introduced into the substrate 108, particularly in comparison to the soldering processes used in the prior art. This allows the use of less expensive material, that is a low melting point material, for the substrate 108, thus lowering the cost of the apparatus 100. For example, substrate 108 can be made of a low melting point material which has a melting point of less than 350°, such polyester, although it will be appreciated by those skilled in the art that other low cost substrate materials would also be suitable candidates.

Figure 4:
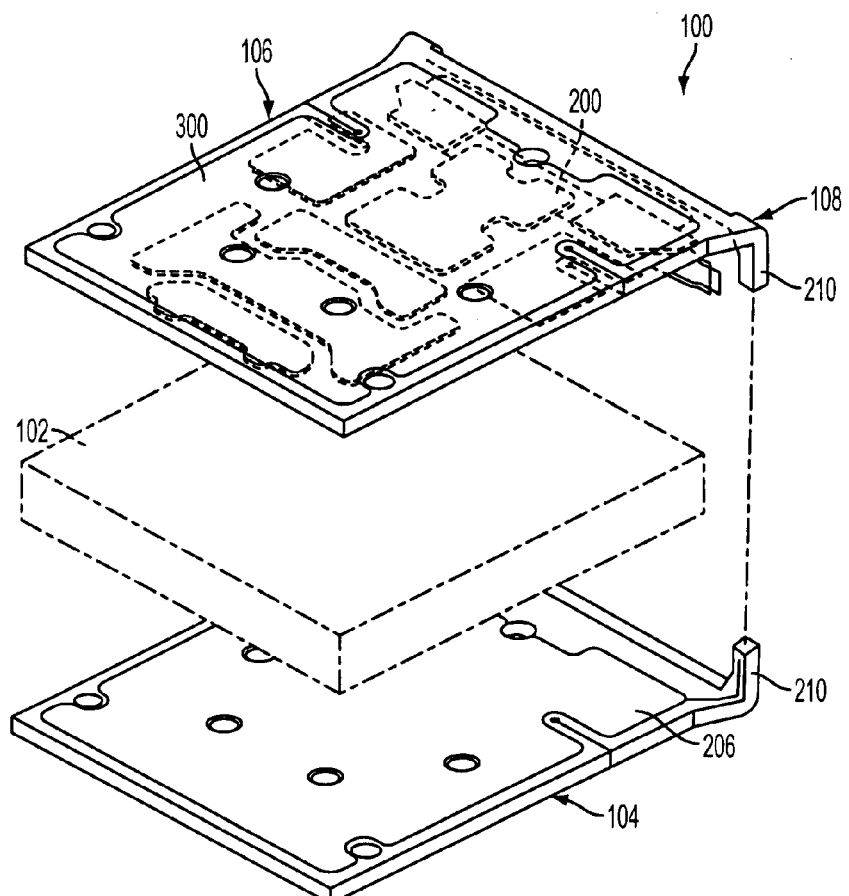
FIG. 4 is an exploded perspective view of the apparatus illustrated in FIG. 1, showing a fluid filled bladder disposed between two sections of the substrate.

As seen in FIG. 4, the substrate 108 is folded at connecting arms 210 and the fluid filled bladder 102 is disposed between the first and second sections 104 and 106 of the substrate 108. The substrate 108 and bladder 102 are then disposed under the seat cushion 110. The controller 204 senses when the seat 112 is occupied by calculating the change in capacitance as the bladder compresses from the weight of the occupant, thereby bring the capacitive array 200 and the reference plane 206 closer together. This change in capacitance provides information for calculating the occupant's weight. Specifically, the magnitude of change in capacitance can be detected between the array 200 and the reference plan 206. This capacitance change is directly proportional to the amount of deformation of the bladder 102, which is in turn proportional to the weight of the person or object in the seat 112.

While a particular embodiment has been chosen to illustrate the invention, it will be understood by those skilled in the art that various changes and modifications can be made therein without departing from the scope of the invention, as defined in the appended claims. For example, each of array 200, reference plane 206, conductors 212, and shield plane 300 can be comprised of PTF inks, although some locations may utilize different combinations of conductive/resistive materials within the matrix.

Also, the present invention can facilitate easy deposit of multiple layers of sensor arrays on a single substrate. Using PTF ink conductors, it is a relatively simple matter of coating each successive array with a layer of non-conductive material, such as a PTF ink that lacks the conductive particles, or a layer of substrate dielectric material in conjunction with an adhesive layer. Additional layers of electrode areas can then be deposited on the preceding dielectric layer.

What is claimed is:

1. An apparatus for occupant detection in a vehicle, comprising:
   a dielectric substrate including,
   a reference plane, and
   a plurality of electrodes forming a capacitive array on said dielectric substrate and coupled to said reference plane, each of said plurality of electrodes being formed of a conductive polymer thick film ink, and
   said plurality of electrodes and said reference plane being connected to a controller that detects a change in capacitance between said plurality of electrodes and said reference plane, and identifies the presence and type of occupant in the vehicle.

2. An apparatus according to claim 1, wherein said dielectric substrate is a unitary one-piece substrate.

3. An apparatus according to claim 2, wherein said dielectric substrate includes an opening between said plurality of electrodes and said reference plane.

4. An apparatus according to claim 2, wherein at least one of said plurality of electrodes being ultrasonically bonded to wiring of the vehicle.

5. An apparatus according to claim 4, wherein said dielectric substrate is made of a low melting point material.

6. An apparatus according to claim 1, wherein said conductive polymer thick film ink includes conductive particles selected from the group consisting of silver, carbon, graphite, nickel, copper, tin, and gold.

7. An apparatus according to claim 1, wherein said conductive polymer thick film ink is printed, silk-screened, stenciled, or sprayed onto said dielectric substrate.

8. An apparatus for occupant detection in a vehicle, comprising:
   a dielectric substrate including first and second sections;
   a reference plane disposed on said first section of said dielectric substrate;
   a plurality of electrodes forming a capacitive array on said second section of said dielectric substrate and coupled to said reference plane, each of said plurality of electrodes being formed of a conductive polymer thick film ink;
   a deformable bladder disposed between said first and second sections of said dielectric substrate; and
   a controller connected to said plurality of electrodes and said reference plane, said controller detecting a change in capacitance between said plurality of electrodes and said reference plane upon compression of said bladder, thereby identifying the presence and type of occupant in the vehicle.

9. An apparatus according to claim 8, wherein said first and second sections of said dielectric substrate form a unitary one-piece substrate.

10. An apparatus according to claim 9, wherein said dielectric substrate includes an opening between said first and second sections of said substrate.

11. An apparatus according to claim 8, wherein at least one of said plurality of electrodes being ultrasonically bonded to wiring of the vehicle.

12. An apparatus according to claim 11, wherein said dielectric substrate is made of a low melting point material.

13. An apparatus according to claim 8, wherein said conductive polymer thick film ink includes conductive particles selected from the group consisting of silver, carbon, graphite, nickel, copper, tin, and gold.

14. An apparatus according to claim 8, wherein said conductive polymer thick film ink is printed, silk-screened, stenciled, or sprayed onto said dielectric substrate.

15. An apparatus for occupant detection in a vehicle, comprising:
   a dielectric unitary one-piece substrate including first and second sections, and an opening between said first and second sections, said dielectric substrate being formed of a low melting point material;

a reference plane disposed on said first section of said dielectric substrate;

a plurality of electrodes forming a capacitive array on said second section of said dielectric substrate and coupled to said reference plane, each of said plurality of electrodes being formed of a conductive polymer thick film ink;

a deformable bladder disposed between said first and second sections of said dielectric substrate; and a controller connected to said plurality of electrodes and said reference plane, said controller detecting a change in capacitance between said plurality of electrodes and said reference plane upon compression of said bladder, thereby identifying the presence and type of occupant in the vehicle.

\* \* \* \* \*